I. C. MILLER & D. F. HOTT.
WATER CLOSET.
APPLICATION FILED DEC. 16, 1905.

986,486.

Patented Mar. 14, 1911.

Witnesses
M. E. Webster.
L. M. Hopkins.

Inventors
Isaac C. Miller
David F. Hott,
By Frank J. Kent, Attorney.

UNITED STATES PATENT OFFICE.

ISAAC C. MILLER AND DAVID F. HOTT, OF CINCINNATI, OHIO.

WATER-CLOSET.

986,486.  Specification of Letters Patent. Patented Mar. 14, 1911.

Application filed December 16, 1905. Serial No. 292,066.

*To all whom it may concern:*

Be it known that we, ISAAC C. MILLER and DAVID F. HOTT, citizens of the United States, residing at Cincinnati, in the county of Hamilton and State of Ohio, have invented certain new and useful Improvements in Water-Closets, of which the following is a specification.

Our invention relates to improvements in drainage apparatus, and is especially useful in connection with water-closets and the like.

It is quite common at the present time to place water-closets outside of houses and other buildings, and covered only by a small frame structure. This outhouse is insufficient to afford suitable protection against the low temperature of winter, and as a result, water in the pipe leading to the hopper and in the trap often freezes and causes more or less serious damage to the parts, which, besides the inconvenience caused by rendering the closet useless, is an item of considerable expense for repairs.

To overcome this and other objections to out-of-door water-closets is the object of our invention.

It is well understood that cold penetrates the ground a greater or less distance, determined by the latitude of a place, and known as the frost line. Below this line water will not freeze if protected by the ground. Advantage is taken of this fact to place those parts of a water closet which contain still or slowly moving water within a pit or other inclosure buried in the ground a sufficient depth to lower the water-feed pipe and trap below the frost-line. The pit is closed by an insulating cover to prevent the cold of the outside air from penetrating to the bottom thereof. The pit is also to be made water-tight, so that water can not enter it from the ground, and of such shape as circumstances require.

We have also provided a new form of trap, having one or more by-passes or sub-traps of smaller diameter than the main trap, through which, normally, pure water only passes, the object of these sub-traps being to carry off all water if at any time the main trap becomes clogged. Fresh water to seal the sub-traps flows from the flushing valve through suitable pipes when water is admitted to the water-closet hopper, and when cut off the pipe leading from said valve to the hopper is drained by the pipe or pipes leading to the sub-traps.

The invention consists in certain novel details of construction, and combination and arrangement of parts, all as will be hereinafter described, and pointed out in the appended claims.

Figure 1:
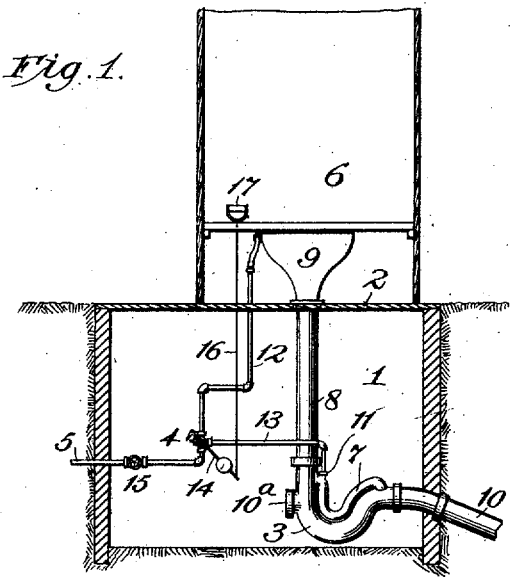
Figure 2:
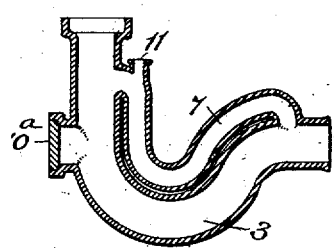
Figure 3:
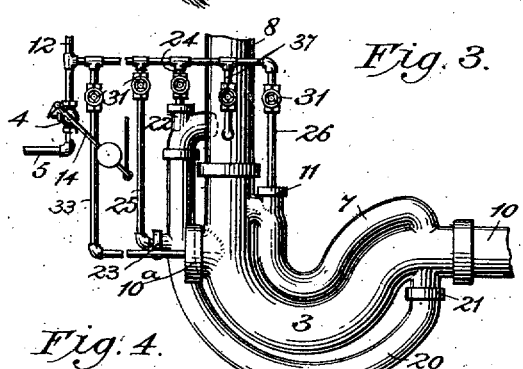
Figure 5:
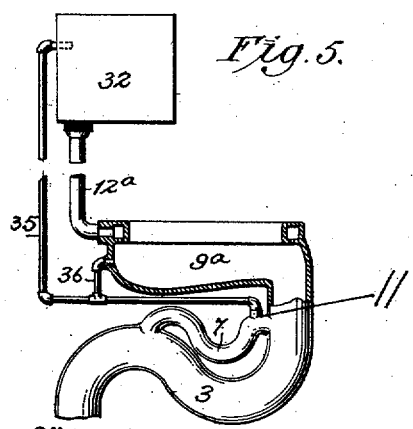
Figure 4:
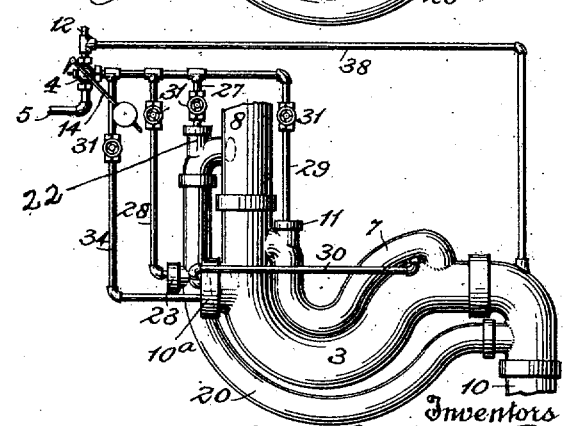

In the accompanying drawings, which are to be taken as a part of this specification: Figure 1 is a view partly in section of our apparatus as it appears in use. Fig. 2 is a sectional view of one form of trap used in connection with our invention; Figs. 3 and 4 and 5 are views in elevation of modified forms of our apparatus.

Similar numerals of reference indicate the same parts in all the figures.

1 indicates a covered pit, casing, or other inclosure positioned in the ground and extending below the frost-line. This pit may be lined with bricks, concrete, or similar suitable material, with a water-tight bottom, and of any preferred shape; or it may be formed of a sheet-metal casing buried in the ground. The top of the pit, as it will hereinafter be called, is substantially even with the surface of the ground, and closed by a cover 2 formed of one or more layers of wood or metal suitably lined with paper or other insulating material.

Within the pit 1 near the bottom is placed the trap 3, water-valve 4, and water-supply pipe 5 of a water-closet. The hopper of the latter is shown supported on the cover 2. It should be noted that as the closet is set up out of doors, it will be exposed to the cold of winter; hence all parts through which water passes slowly, or in which it may collect, are placed in the earth below the frost-line.

The trap 3, which may be of any well known or preferred shape, has formed integrally therewith, or attached thereto, a second trap 7 of smaller diameter through which fresh water only is adapted to pass. The inlet end of the trap 3 is connected to a straight length of pipe 8 leading from the hopper 9 of the closet 6, while its other end is joined to a pipe 10 leading, preferably, to a sewer. To enable the trap 3 to be cleaned, a hand-hole 10ª is provided on one side near the bend of the trap, and closed with a suitable cover. The smaller trap 7 may also have a hand-hole 11 at the top.

The water-supply pipe 5 is shown connected to the flushing-valve 4, a stop-cock 15 on said pipe permitting the water to be cut off from the system when desired. From the flushing-valve 4 a pipe 12 extends upwardly to the hopper 9 for flushing the same when necessary. A second pipe 13 also connected to the valve 4 passes to and is sealed within the hand-hole 11 in the smaller trap 7. A weighted lever 14 is adapted to be raised by a rod or chain 16 supplied with a handle 17 near the hopper 9, when the flushing valve is to be opened, and on releasing the handle the lever falls by gravity, closing the valve.

A part of the water entering through the supply-pipe 5 is diverted from the hopper and passes through the pipe 13 when the valve 4 is opened, and enters the smaller trap 7, the same pipe 13 also carrying off all water left in the pipe 12 and valve 4 when the latter is closed, thus draining pipe 12 and guarding against freezing.

Should the trap 3 at any time become choked by anything entering or placed within it, overflow at the hopper is prevented by means of the small trap 7 through which all water can pass to the sewer; and since trap 7 is kept sealed by fresh water from valve 4 and pipe 13, there is no danger of gases or odor escaping from the sewer.

While we have shown the above described trap and drainage apparatus in connection with out-of-door service, it is to be understood that it is equally applicable for indoor use.

Modified forms of the invention are illustrated in Figs. 3 and 4. As there shown, an additional sub-trap 20 of the same size as the trap 7 is placed below the main trap 3, or it may be placed at one side thereof, its receiving end connected to the soil pipe 8 and its delivery end to the trap 3 as at 21 (see Fig. 3), or to the sewer branch 10 as shown in Fig. 4. The additional sub-trap 20 has a hand-hole 22 at its upper end into which fresh water is received from the valve 4 or the flush pipe 12. A second hand-hole 23 is formed on the trap 20, through which it may be cleaned if necessary. Into this hole, suitably capped, fresh water may enter from the valve 4, flush pipe 12, or from the trap 7 near the outlet of the latter. In Fig. 3 pipes 24, 25, 26, and 33 are shown branching from the flush-pipe 12 to the hand-holes 22, 23, 11, and 10ª respectively. In Fig. 4 branch pipes 27, 28, 29, and 34 are shown running from the flushing valve 4 to the respective hand-holes 22, 23, 11 and 10ª, and an additional pipe 30 connects the trap 7 to the hand-hole 10ª. Any one of these pipes may be used independently, or two or more simultaneously. To cut off the water supply through one or more of the aforesaid pipes, cocks 31 are applied thereto. Water from the flush pipe 12 may also enter the soil pipe 8 through a pipe 37 (see Fig. 3), or into the sewer, beyond the trap 4, by way of the pipe 38, as represented in Fig. 4.

In the modification shown in Fig. 5, a flush tank 32 is used to wash out the bowl or hopper 9ª. A pipe 35 enters the tank at or near the water line therein to carry off any excess of water, thereby preventing it from overflowing. The pipe 35 empties into the small trap 7 through the hand-hole 11. To prevent the hopper 9ª from overflowing should the trap 3 get out of order, a pipe 36 is connected thereto and to the overflow pipe 35.

We do not restrict ourselves to the exact details of construction, combination, and arrangement herein set forth, it being obvious that minor variations thereof, not involving the exercise of invention, may be made by the skilled mechanic, and such departures not involving invention we consider within the scope and terms of our claims.

What we claim is:—

1. In a water-closet, a trap therefor having a plurality of supplemental traps of less diameter connected therewith and opening thereinto at opposite ends, and a drain pipe opening from one of said supplemental traps into another of said supplemental traps.

2. In a water-closet, a flushing valve, a flushing pipe, a main trap, a supplemental trap connected therewith and opening thereinto, a drain pipe for said flushing pipe opening into said main trap, and a drain pipe for the flushing pipe opening into said supplemental trap.

3. In a water-closet, a flushing valve, a flushing pipe, a water supply pipe, a main trap, a supplemental trap connected therewith and opening thereinto, and a drain pipe connecting the flushing pipe with the supplemental trap, the said flushing valve being adapted to open communication between the water supply pipe and the flushing and drain pipes, respectively, and communication between said flushing pipe and drain pipe being always open.

4. In a water-closet, a trap therefor having a plurality of supplemental traps connected therewith and opening thereinto at opposite ends, a water supply pipe, a pipe connection between said supply pipe and each of said supplemental traps, and a valve for controlling the flow into the said supplemental traps respectively.

5. In a water-closet, a hopper, a soil pipe, a main trap, a supplemental trap connected therewith and opening thereinto, a water supply pipe opening into the hopper and into the supplemental trap respectively, and
5 another connection between the supply pipe and the exit end of the main trap, whereby siphonic action may be induced in said main trap.

In testimony whereof we affix our signatures in presence of two witnesses.

ISAAC C. MILLER.
DAVID F. HOTT.

Witnesses:
JOHN J. FASSER,
FRANK KROELL.

Copies of this patent may be obtained for five cents each, by addressing the "Commissioner of Patents, Washington, D. C."